United States Patent
Nakamura et al.

(10) Patent No.: US 9,325,862 B2
(45) Date of Patent: Apr. 26, 2016

(54) SERVER, CLIENT TERMINAL, SYSTEM, AND STORAGE MEDIUM FOR CAPTURING LANDMARKS

(71) Applicant: SONY CORPORATION, Tokyo (JP)

(72) Inventors: Takatoshi Nakamura, Kanagawa (JP); Yoichiro Sako, Tokyo (JP); Akira Tange, Tokyo (JP)

(73) Assignee: SONY CORPORATION, Tokyo (JP)

( * ) Notice: Subject to any disclaimer, the term of this patent is extended or adjusted under 35 U.S.C. 154(b) by 495 days.

(21) Appl. No.: 13/764,044

(22) Filed: Feb. 11, 2013

(65) Prior Publication Data
US 2013/0262565 A1 Oct. 3, 2013

(30) Foreign Application Priority Data

Mar. 27, 2012 (JP) ................................. 2012-071338

(51) Int. Cl.
| | | |
|---|---|---|
| *H04N 1/00* | (2006.01) | |
| *H04L 29/06* | (2006.01) | |
| *G06F 17/30* | (2006.01) | |
| *H04W 4/02* | (2009.01) | |

(52) U.S. Cl.
CPC ...... *H04N 1/00183* (2013.01); *G06F 17/30241* (2013.01); *H04L 67/42* (2013.01); *H04N 1/00127* (2013.01); *H04N 1/00161* (2013.01); *H04W 4/023* (2013.01)

(58) Field of Classification Search
CPC .......... G06F 17/3028; G06F 17/30265; G06F 17/30241; H04N 1/00196; H04N 1/00198; H04N 1/00204; H04N 1/00244; H04N 1/00323; H04N 1/00183; H04N 1/00161; H04N 1/00127
See application file for complete search history.

(56) References Cited

U.S. PATENT DOCUMENTS

| | | | | |
|---|---|---|---|---|
| 6,301,440 B1* | 10/2001 | Bolle | ............ | H04N 5/232 348/229.1 |
| 7,801,674 B2* | 9/2010 | Asai | .............................. | 701/522 |
| 8,264,584 B2* | 9/2012 | Mukai et al. | ............. | 348/333.02 |
| 8,301,374 B2* | 10/2012 | Surampudi et al. | ........... | 701/438 |
| 8,538,164 B2* | 9/2013 | Zitnick, III | ................... | 382/199 |
| 8,810,599 B1* | 8/2014 | Tseng | ........................... | 345/633 |

(Continued)

FOREIGN PATENT DOCUMENTS

| | | | |
|---|---|---|---|
| JP | 2002185846 A | * | 6/2002 |
| JP | 2008-131405 | | 6/2008 |

OTHER PUBLICATIONS

Hisashi, Yokogawa, "Translation of JP2002185846A", Jun. 28, 2002.*

(Continued)

*Primary Examiner* — Ramy M Osman
(74) *Attorney, Agent, or Firm* — Hazuki International, LLC (57) ABSTRACT

There is provided a server including a database configured to store position information and priority of a landmark, a reception unit configured to receive, from a client terminal, position information of the client terminal, and a transmission unit configured to transmit, to the client terminal, the position information of the landmark corresponding to the position information received by the reception unit, and the priority of the landmark. The reception unit receives position information of a subject captured by the client terminal. Based on the position information of the subject received by the reception unit, the server further includes a control unit configured to perform control in a manner that the priority of the landmark stored in the database is updated.

19 Claims, 8 Drawing Sheets

(56) References Cited

U.S. PATENT DOCUMENTS

| | | | |
|---|---|---|---|
| 8,817,131 B2 * | 8/2014 | Sasai | H04N 1/00323 348/231.3 |
| 8,890,896 B1 * | 11/2014 | Tseng | 345/633 |
| 2005/0172147 A1 * | 8/2005 | Edwards | H04N 1/00244 726/22 |
| 2007/0165968 A1 * | 7/2007 | Terayoko | 382/305 |
| 2007/0179705 A1 * | 8/2007 | Asai | 701/200 |
| 2009/0033768 A1 * | 2/2009 | Toyoda | H04N 1/32128 348/231.3 |
| 2009/0160970 A1 * | 6/2009 | Fredlund | H04N 5/232 348/229.1 |
| 2009/0289955 A1 * | 11/2009 | Douris | G06T 11/00 345/630 |
| 2010/0149399 A1 * | 6/2010 | Mukai et al. | 348/333.02 |
| 2010/0293224 A1 * | 11/2010 | Moriwaki | 709/203 |
| 2011/0007901 A1 * | 1/2011 | Ikeda | H04B 5/02 380/270 |
| 2011/0054308 A1 * | 3/2011 | Cohen | A61B 5/06 600/424 |
| 2011/0054791 A1 * | 3/2011 | Surampudi et al. | 701/216 |
| 2011/0085025 A1 * | 4/2011 | Pace | H04N 9/8205 348/49 |
| 2011/0123120 A1 * | 5/2011 | Quack | 382/197 |
| 2012/0099796 A1 * | 4/2012 | Zitnick, III | 382/199 |

OTHER PUBLICATIONS

USPTO, "Final Office Action for U.S. Appl. No. 11/961,497", Mar. 17, 2011.*

U.S. Appl. No. 13/748,870, filed Jan. 24, 2013, Nakamura, et al.

* cited by examiner

EXAMPLE OF DATA INCLUDING PRIORITY

| LANDMARK | POSITION INFORMATION | PRIORITY | OTHER RELATED LANDMARK | RECOMMENDATION DATA | RELATED INFORMATION |
|---|---|---|---|---|---|
| L1 | P1 | 2 | L3··· | 13 O'CLOCK TO 17 O'CLOCK... | BB TEMPLE SINCE FEUDAL GOVERNMENT PERIOD... |
| L2 | P2 | 1 | L1··· | 18 O'CLOCK TO 20 O'CLOCK... | AA TOWER BUILT IN 1870... |
| L3 | P3 | 3 | L4··· | 8 O'CLOCK TO 12 O'CLOCK... | CC GUARDIAN DEITIES THEIR SERENE FACES... |
| L4 | ··· | 4 | ··· | | ··· |

SERVER, CLIENT TERMINAL, SYSTEM, AND STORAGE MEDIUM FOR CAPTURING LANDMARKS

BACKGROUND

The present disclosure relates to a server, a client terminal, a system, and a storage medium.

In recent years, a digital camera that stores and preserves a subject image in a recording medium as a digital image signal has been widely used. A user directs a digital camera toward a subject, visually recognizes an image displayed on a viewfinder, and presses a shutter button at a given timing.

Here, JP 2008-131405A discloses an imaging device that displays the position of a face in an image including face(s) as a technology relating to such a digital camera.

In addition to display of the face of a subject (person) using the face recognition technology such as the technology described in JP 2008-131405A, an imaging device is proposed that focuses on the recognized face, or optimizes exposure of the face part. Further, a face preferential technology is proposed that automatically performs an image capturing operation by preferentially focusing on the face of a child, or a smiling face over the other recognized faces.

SUMMARY

Although each of the technologies described above achieves a preferential focus by specializing in the face of a subject (person) with the face recognition technology, a subject that a user desires to preferentially capture is not limited to a face. For example, it is possible that a user desires to preferentially capture an especially famous spot (landmark) including a natural object and an architecture.

Therefore, the present disclosure proposes a server, a client terminal, a system, and a storage medium that are novel and improved, and are capable of showing a landmark having high priority among subjects included in an angle of view.

According to an embodiment of the present disclosure, there is provided a server including a database configured to store position information and priority of a landmark, a reception unit configured to receive, from a client terminal, position information of the client terminal, and a transmission unit configured to transmit, to the client terminal, the position information of the landmark corresponding to the position information received by the reception unit, and the priority of the landmark. The reception unit receives position information of a subject captured by the client terminal. Based on the position information of the subject received by the reception unit, the server further includes a control unit configured to perform control in a manner that the priority of the landmark stored in the database is updated.

According to another embodiment of the present disclosure, there is provided a client terminal including a transmission unit configured to transmit, to a server, position information of the client terminal, a reception unit configured to receive, from the server, position information and priority of a landmark positioned near a position of the client terminal indicated in the position information, and a control unit configured to perform display control on an indicator indicative of a particular subject in an angle of view based on the position information and the priority of the landmark that are received from the server.

According to the embodiments of the present disclosure described above, there is provided a system including a database configured to store position information and priority of a landmark, and a control unit configured to perform display control on an indicator indicative of a particular subject in an angle of view based on the position information of the landmark corresponding to position information of a client terminal, and the priority of the landmark. The control unit performs control based on position information of a subject captured by the client terminal in a manner that the priority of the landmark stored in the database is updated.

According to the embodiments of the present disclosure described above, there is provided a storage medium having a program stored therein, the program causing a computer to execute receiving, from a client terminal, position information of the client terminal, transmitting, to the client terminal, position information of a landmark corresponding to the position information received in the receiving step, and priority of the landmark, receiving position information of a subject captured by the client terminal, and performing control based on the position information of the subject in a manner that the priority of the landmark stored in a database is updated.

According to the embodiments of the present disclosure described above, there is provided a storage medium having a program stored therein, the program causing a computer to execute transmitting, to a server, position information of a client terminal, receiving, from the server, position information and priority of a landmark positioned near a position of the client terminal that is indicated in the position information, and performing display control on an indicator indicative of a particular subject in an angle of view based on the position information and the priority of the landmark received from the server.

According to the embodiments of the present disclosure described above, it is possible to indicate the landmark having high priority among subjects included in the angle of view.

DETAILED DESCRIPTION OF THE EMBODIMENT(S)

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Embodiments of the present disclosure will be described in the following order.
1. Overview of Imaging System in Accordance with Embodiment of Present Disclosure
2. Basic Configurations
2-1. Configuration of Digital Camera
2-2. Configuration of Server
3. Operation Process
4. Conclusion <1. Overview of Imaging System in Accordance with Embodiment of Present Disclosure>

Figure 1:
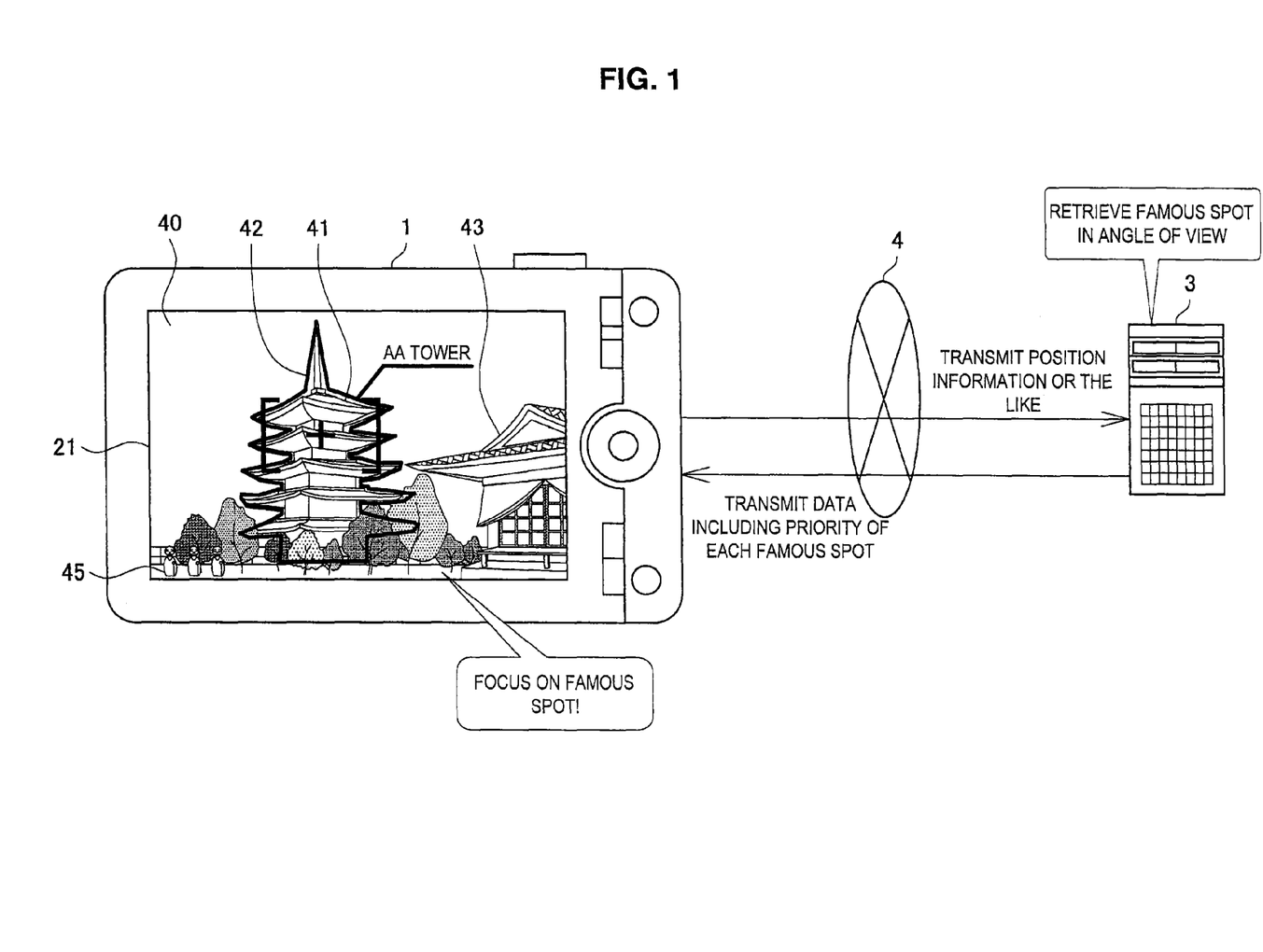
FIG. 1 is a diagram for describing an overview of an imaging system in accordance with an embodiment of the present disclosure.

First, an overview of an imaging system in accordance with an embodiment of the present disclosure will be described with reference to FIG. 1. As illustrated in FIG. 1, the imaging system in accordance with the embodiment of the present disclosure includes a digital camera 1, which is an example of a client terminal, and a server 3. The digital camera 1 and the server 3 can be connected via a network 4.

As illustrated in FIG. 1, the digital camera 1 in accordance with the present embodiment displays a captured image (real image 40) obtained by capturing a real space on a viewfinder (display unit 21). The digital camera 1 transmits, to the server 3, the position information, the image capturing direction, or the like of the digital camera 1. The server 3 retrieves a famous spot (landmark) near the digital camera 1, and transmits the data including priority of each famous spot to the digital camera 1.

Then, the digital camera 1 performs display control based on the data including priority of each famous spot that has been received from the server 3 such that a famous spot having high priority among the respective famous spots shown in the real image 40 is displayed. In the present specification, the priority is an index for indicating a particular landmark among respective landmarks (subjects) in the angle of view.

More specifically, as illustrated in FIG. 1, for example, when the real image 40 includes subjects 41, 43, and 45, the digital camera 1 adjusts a degree of focus and focuses on a famous spot (subject 41, for example) having high priority among the recognized subjects. The digital camera 1 may also superimpose a marker 42 indicative of the position of the recognized subject 41 on the real image 40. Further, the digital camera 1 may superimpose the name "AA tower" of the subject 41 on the real image 40.

In this way, the digital camera 1 in accordance with the present embodiment informs a user of a famous spot having high priority. Therefore, a user can intuitively recognize which of the subjects shown in the real image 40 is a famous spot.

The priority of each famous spot (landmark) may be determined based on, for example, statistical data including an operation history of each user that is collected in the server 3. For example, subjects that a lot of users have focused on and captured are registered in the server 3 as landmarks. Further, the priority of the landmarks is updated in accordance with statistics on the number of times of image-capturing.

The basic configurations of the digital camera 1 and server 3 included in the imaging system, and an operation process of the imaging system in accordance with the present embodiment will be specifically described below. It is noted that although the digital camera 1 is shown as a client terminal in the present embodiment, a client terminal in accordance with an embodiment of the present disclosure is not limited thereto. For example, a client terminal in accordance with the present embodiment may be a video camera, a smartphone having a camera, personal digital assistants (PDA), a personal computer (PC), a mobile phone, a portable music player, a portable image processing device, a portable video game device, a telescope, binoculars, or the like.

A client terminal in accordance with the present embodiment is not limited to a device having a camera, and is applicable to a device capable of acquiring the position information and the direction information of the device, such as a device having a GPS or a direction sensor, for example. Further, a client terminal in accordance with the present embodiment is applicable to a device to which the position information and the direction information of the device can be manually input, even though the device that does not have a GPS or a direction sensor.

<2. Basic Configurations>

[2-1. Configuration of Digital Camera]

Figure 2:
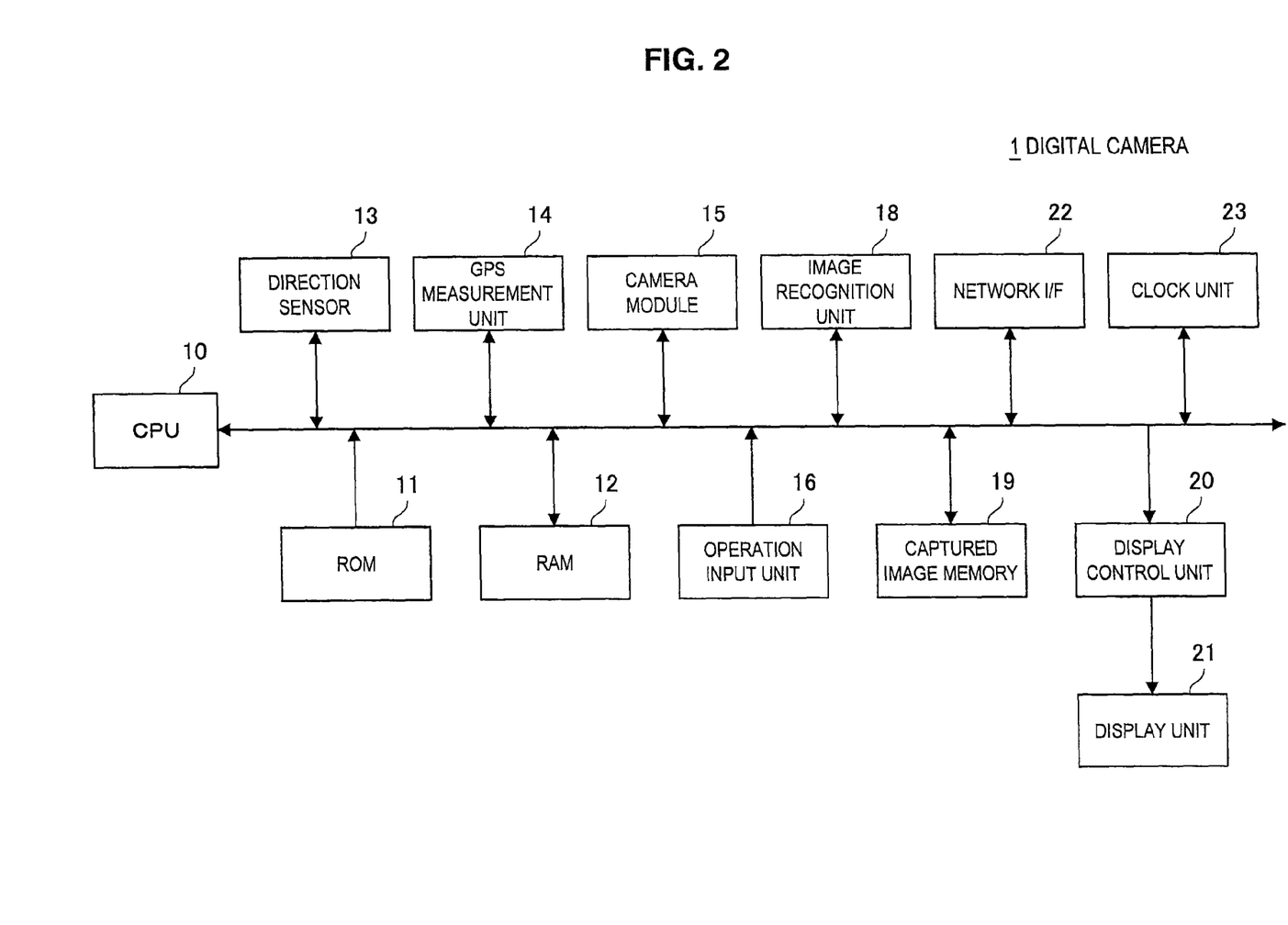
FIG. 2 is a block diagram illustrating a configuration of a digital camera in accordance with the present embodiment.

FIG. 2 is a block diagram illustrating a configuration of the digital camera 1 in accordance with the present embodiment. As illustrated in FIG. 2, the digital camera 1 includes a CPU 10, ROM 11, RAM 12, a direction sensor 13, a GPS measurement unit 14, a camera module 15, an operation input unit 16, an image recognition unit 18, captured image memory 19, a display control unit 20, a display unit 21, a network interface (I/F) 22, and a clock unit 23. Each configuration will be described below.

The direction sensor 13 detects a direction of an optical axis of lens optics, namely, an image capturing direction, of the camera module 15, and outputs information (direction information) regarding the detected image capturing direction. It is noted that although the digital camera 1 having the camera module 15 is used herein as an example of a client terminal, as discussed above, a client terminal in accordance with the present embodiment is not limited to a device having a camera. When a client terminal does not have any camera, the direction sensor 13 may output, as direction information, the direction in which a particular portion of the client terminal faces. Additionally, the direction sensor 13 may be realized as an acceleration sensor, a geomagnetic sensor, or the like.

The GPS (Global Positioning System) measurement unit 14 receives a radio wave from a GPS satellite, detects a position at which the digital camera 1 is present, and outputs the detected position information. It is noted that the GPS measurement unit 14 is an example of a position information acquisition unit that detects the position of the digital camera 1 based on an external acquired signal. In addition, the position information acquisition unit may detect the position by performing transmission to, reception from, or near field communication with WiFi, a mobile phone, a PHS, a smartphone, or the like, for example.

The camera module 15 includes an image sensor, an imaging optics including an imaging lens, and a captured image signal processing unit, and outputs data of a captured image in the form of a digital signal. It is noted that an image sensor is realized as, for example, a CCD (Charge Coupled Device) imager or a CMOS (Complementary Metal Oxide Semiconductor) imager.

The operation input unit 16 is a shutter button, a zoom dial, a group of physical keys including various types of switches, a touch panel provided by being laminated on the display unit 21, or the like for detecting a camera operation performed by a user. The CPU 10 performs a process in response to the user operation input from the operation input unit 16 in accordance with a program stored in the ROM 11.

The image recognition unit 18 has a function of recognizing a subject (object) included in a real image. Here, the image recognition unit 18 may use recognition information (including a recognizer, recognition pattern data, recognition dictionary data, or dedicated recognition algorithm) in accordance with a type of a target to be recognized. The image recognition unit 18 in accordance with the present embodiment may switch, as necessary, recognition information to be used. For example, the recognition information may be recognition information for recognizing a building when the digital camera 1 is located in a district where a lot of large buildings are present, or recognition information for recognizing a temple when a famous spot included in a real image is a temple.

Additionally, the recognition information used when the image recognition unit 18 recognizes a subject may be transmitted from the server 3. As discussed below, the server 3 transmits the recognition information for recognizing a landmark along with the position information and the priority of the landmark.

When a plurality of dedicated recognition algorithm, dedicated recognition dictionary data, and the like are stored in the ROM 11 in advance, the image recognition unit 18 may switch the recognition information to be used in accordance with a recognition switching parameter transmitted from the server 3.

For example, flash memory such as card type memory is used for the captured image memory 19. Alternatively, the captured image memory 19 may be a recoding medium such as a DVD (Digital Versatile Disc). Further, the captured image memory 19 does not have to be such a removal memory medium, and may be a hard disc device.

The captured image memory 19 may store, as captured images, images of a subject that are successively output from the camera module 15 in accordance with the operation timing of the shutter button. At that timing, the captured image memory 19 may store, as image capturing time, the time information output from the clock unit 23 when the shutter button is operated (image is captured) in association with the captured image.

Additionally, the captured image memory 19 may store position information output from the GPS measurement unit 14, and an image capturing direction output from the direction sensor 13 when the shutter button is operated (image is captured) in association with the captured image. Further, the captured image memory 19 may store an operation history (regarding which subject in the captured image is focused on, zoomed on, or the like) output from the operation input unit 16 and the camera module 15 in association with the captured image.

The CPU 10 (main control unit) controls each configuration of the digital camera 1. The CPU 10 in accordance with the present embodiment performs control based on data including priority that includes the priority and the position information received from the server 3 such that a subject having higher priority among subjects in the angle of view is indicated in the subject images output from the camera module 15. For example, the CPU 10 may automatically set an image capturing parameter of the camera module 15. The image capturing parameter is a parameter or the like for adjusting, for example, a degree of focus, white balance, or exposure. Accordingly, the CPU 10 can focus on a subject having high priority, and can adjust white balance or exposure.

In addition to a program for performing an image capturing function, the ROM 11 stores programs or the like for performing an image recognition process, for automatically setting an image capturing parameter in accordance with the priority of a landmark, and for performing a display control process. Additionally, the CPU 10 executes the programs stored in the ROM 11 using the RAM 12 as a work area.

The display control unit 20 performs display control on display contents of a display screen that is displayed on the display unit 21 in accordance with control of the CPU 10 based on the programs stored in the ROM 11. The display control unit 20 in accordance with the present embodiment may perform control based on data including priority that includes the priority and the position information of a landmark received from the server 3 such that an indicator indicative of a particular subject among subjects shown in an image (in an angle of view) recognized by the image recognition unit 18 is displayed. Accordingly, the display control unit 20 can explicitly indicate a subject having high priority (namely, a famous spot).

The display control unit 20 controls display of the display unit 21 included in the digital camera 1 in the present embodiment. However, it is noted that a target apparatus to be controlled in accordance with the present embodiment is not limited to the display unit 21, and the display control unit 20 may control, for example, display of an external display device connected to the digital camera 1.

The display unit 21 displays an image (real image) of a subject output from the camera module 15 in real time in addition to a menu screen, various types of operation screens, or the like in accordance with control of the display control unit 20, and displays a captured image stored in the captured image memory 19. The display unit 21 is realized as, for example, an LCD (Liquid Crystal Display), an OLED (Organic Light-Emitting Diode), or the like.

Additionally, the display unit 21 in accordance with the present embodiment indicates a famous spot having high priority shown in a real image in accordance with control of the display control unit 20. A display example of a specific famous spot displayed on the display unit 21 will be described in "3. Operation Process" below.

The network I/F 22 is a communication module for transmitting data to and receiving data from an external device. For example, the network I/F 22 in accordance with the present embodiment is connected to the server 3 via the network 4, and transmits, to the server 3, position information, image capturing direction information, a captured image, an operation history, or the like. Here, the operation history is a camera operation history of a user output from, for example, the operation input unit 16 or the camera module 15. More specifically, the operation history may be data indicating which subject in a captured image is focused on or zoomed on.

The network I/F 22 in accordance with the present embodiment also receives, from the server 3, recognition information or the like that is necessary for recognizing the position information of a landmark, the priority of the landmark, and the landmark.

The configuration of the digital camera 1 in accordance with the first embodiment has been described in detail above. Next, the configuration of the server 3 in accordance with the present embodiment will be described with reference to FIG. 3.

[2-2. Configuration of Server]

Figure 3:
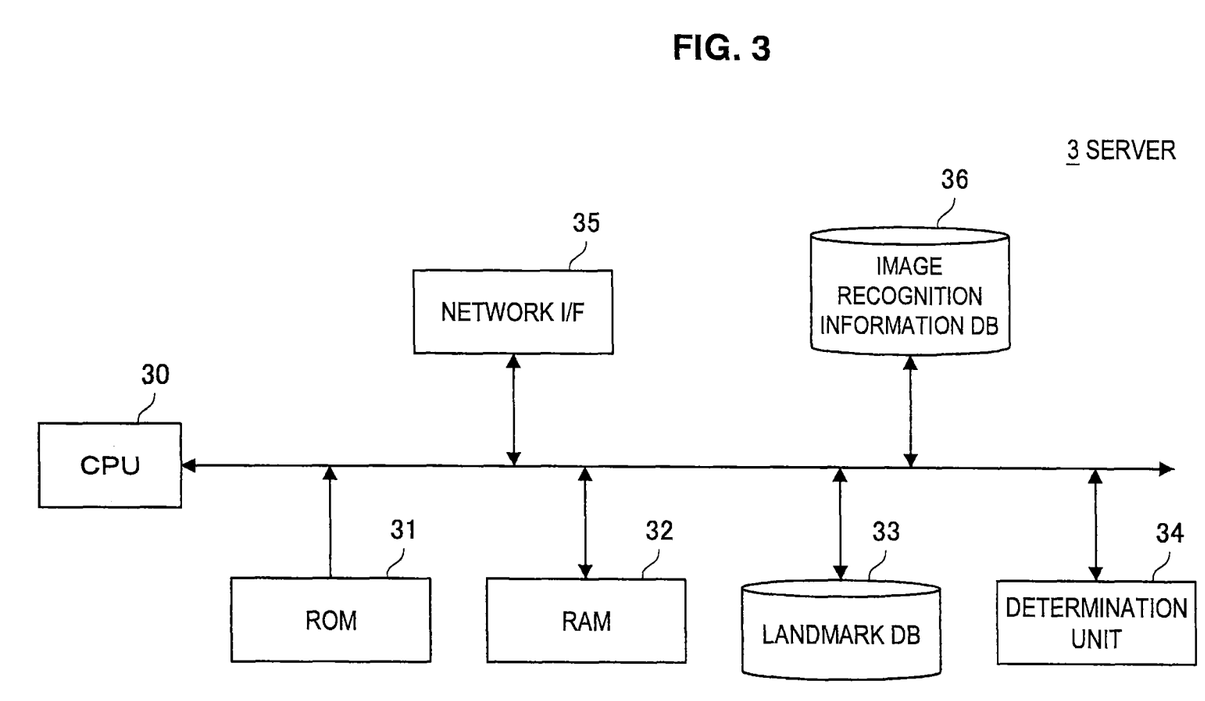
FIG. 3 is a block diagram illustrating a configuration of a server in accordance with the present embodiment.

As illustrated in FIG. 3, the server 3 includes a CPU 30, ROM 31, RAM 32, a landmark database (DB) 33, a determination unit 34, a network interface (I/F) 35, and an image recognition information database (DB) 36. Each configuration will be described below.

(Landmark DB 33)

The landmark DB 33 stores the position information and the priority associated with a landmark such as a famous spot. The priority may be acquired in advance from statistical data of, for example, an operation history (operation history including, for example, an operation of focusing or zooming)

of a user, or may be determined by the determination unit 34 in response to a request from the digital camera 1.

Further, the priority may be independently set by a service provider. Accordingly, an owner of a landmark, or the like can make the priority of the landmark that he/she possesses higher at his/her expense.

The landmark DB 33 may store recommendation data of a landmark. In the present specification, the recommendation data of a landmark is recommendation data regarding image-capturing including a recommended time period and composition information when the landmark is captured, and a thumbnail of an image captured in the recommended time period and the composition. Here, the composition information is an example of a recommended image capturing condition, and the recommended image capturing condition also includes, for example, an image capturing parameter for controlling white balance, exposure, or the like.

The landmark DB 33 may store related information of a landmark. In the present specification, the related information of a landmark is the name, the explanation, or the like of the landmark.

The landmark DB 33 may store information indicative of another landmark related to the landmark. For example, as spots having a common topic, background, and history including each spot used for shooting a popular drama are related to each other, it is possible that a user successively uses the spots for image-capturing. The server 3 can also determine, actually based on statistical data of the operation history of each user, that a plurality of subjects captured in the same period by the users are related to each other, and can update the landmark DB 13.

(Determination Unit 34)

The determination unit 34 determines the priority of each landmark included in the angle of view of the digital camera 1 based on the position information and the image capturing direction of the digital camera 1. For example, the determination unit 34 may retrieve a plurality of landmarks positioned near the digital camera 1 (in the angle of view, for example) from the landmark DB 33, and may determine, as priority, a ranking with respect to a degree of famousness (attention) of each landmark based on the operation history (statistical data) of each landmark.

Here, the determination unit 34 may determine the priority of each landmark by assigning weight to the operation history. For example, the determination unit 34 may assign more weight to an operation history of a celebrity than that of an ordinary person.

The determination unit 34 may also determine priority in accordance with an attribute of a user. For example, the determination unit 34 may determine the priority of each landmark by assigning more weight to an operation history of a celebrity that the user likes.

(Image Recognition Information DB 36)

The image recognition information DB 36 is recognition information that is necessary for recognizing a landmark included in an image. For example, the image recognition information DB 36 stores, as recognition information, a recognizer, recognition pattern data, recognition dictionary data, dedicated recognition algorithm, or the like. The image recognition information DB 36 may store a recognition switching parameter for switching to the recognition information necessary when the digital camera 1 has a plurality of recognition information.

(Network I/F 35)

The network I/F 35 is a communication module for transmitting data to and receiving data from the digital camera 1 via the network 4. The network I/F 35 in accordance with the present embodiment receives position information, image capturing direction information, a captured image, an operation history, or the like from the digital camera 1.

Additionally, the network I/F 35 transmits the position information, the priority, the recommended data, and the like of a landmark in the angle of view to the digital camera 1. A specific example of data including priority that the server 3 transmits to the digital camera 1 in this way will be described below.

The network I/F 35 may transmit recognition information for recognizing a landmark along with the position information and the priority of the landmark.

(CPU 30, ROM 31, and RAM 32)

The CPU 30 controls each configuration of the server 3. The CPU 30 in accordance with the present embodiment extracts (determines), based on the position information and the image capturing direction of the digital camera 1, the position information, the priority, the recommendation data, and the like of each landmark included in the angle of view of the digital camera 1 from the landmark DB 33.

The CPU 30 may extract the priority or the like of each landmark included in the angle of view based on the position information of the digital camera 1, current time (including a date, time, and a season), or the like by using a method in accordance with a situation including statistics with respect to a location, time, and a combination thereof. In this way, by limiting a landmark to be extracted (determined) in accordance with a situation, it is possible to reduce a burden of an extraction process, or increase speed of an extraction process. The priority of a landmark may be priority that is determined by the determination unit 34.

The CPU 30 extracts (determines), from the image recognition information DB 36, recognition information that is necessary for recognizing a landmark included in the angle of view.

The CPU 30 further transmits, to the digital camera 1, the recognition information including the position information, the priority, and the recommendation data of each landmark by controlling the network I/F 35.

The ROM 31 stores software programs or the like for causing the CPU 30 to perform the extraction (determination) process, causing the determination unit 34 to perform the determination process of priority, and causing the network I/F 35 to transmit the data including priority of each landmark to the digital camera 1, the processes of which have been described above. The CPU 30 executes the processes in accordance with the above-mentioned software programs stored in the ROM 31 by using the RAM 32 as a work area.

The configuration of the server 3 in accordance with the first embodiment has been described in detail above. Next, a specific example of data including priority that is transmitted from the server 3 to the digital camera 1 will be described with reference to FIG. 4.

(Example of Data Including Priority)

Figure 4:
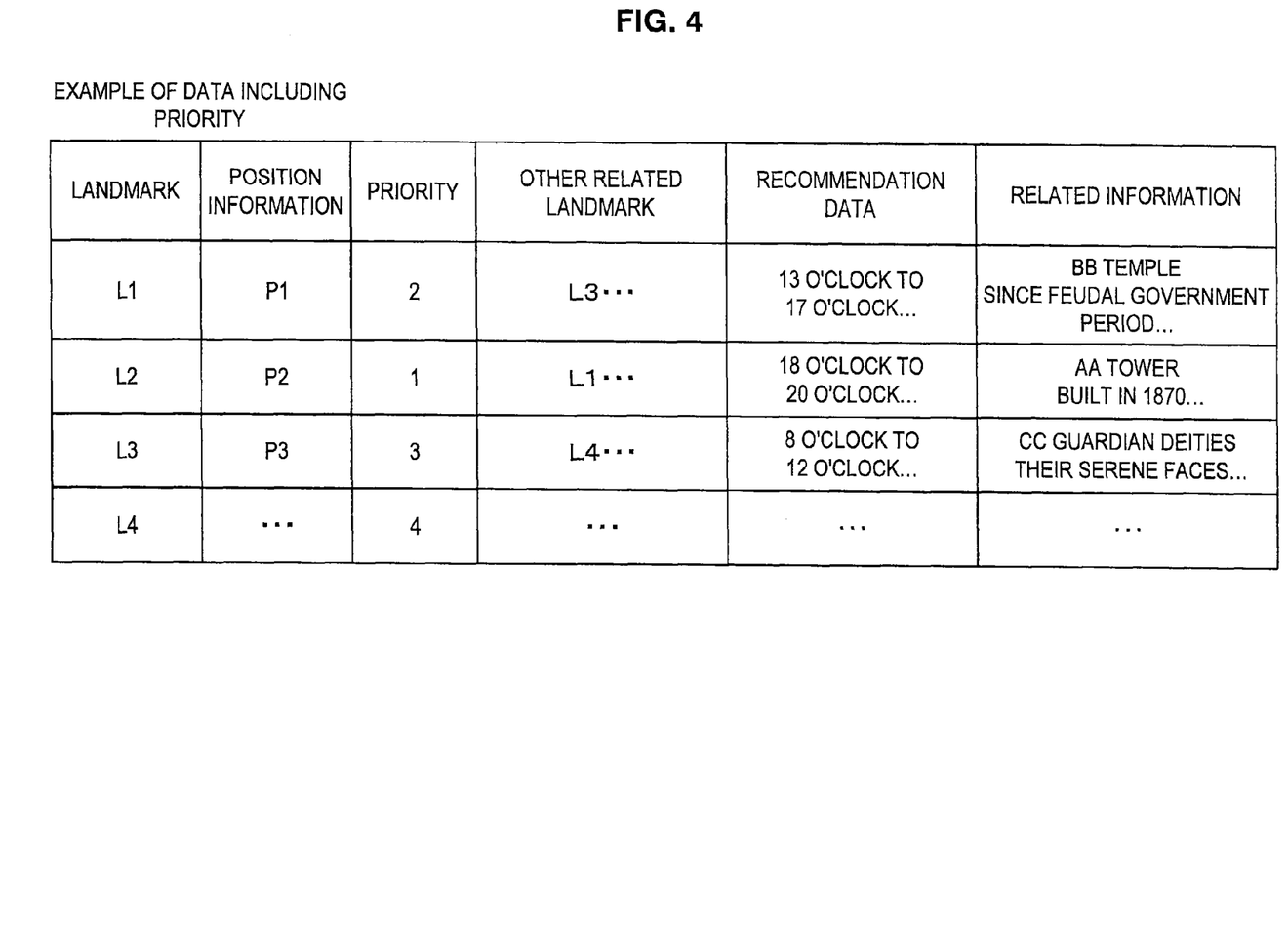
FIG. 4 is a diagram illustrating an example of data including priority that the server in accordance with the present embodiment transmits to the digital camera.

FIG. 4 is a diagram illustrating an example of data including priority in accordance with the present embodiment. As illustrated in FIG. 4, the server 3 transmits, to the digital camera 1, data including priority that includes pieces of position information (P1 to P4), priority, other related landmarks, recommendation data, and related information of each landmark included in the angle of view.

As discussed above, the priority is an index for indicating a particular landmark among the respective landmarks in the angle of view. In the example illustrated in FIG. 4, the CPU 30 of the server 3 determines that landmarks L1 to L4 are included in the angle of view of the digital camera 1, and extracts priority rankings 1 to 3 as the priority of those landmarks. The priority rankings 1 to 4 may be priority determined by the determination unit 34 based on statistics regarding the operation history of each user for the landmarks L1 to L4.

As discussed above, the other related landmarks are information (including, for example, position information, a name, and an explanation) indicative of other landmarks related to the landmark. In the example illustrated in FIG. 4, for example, the landmark L1 is related to the landmark L3, the landmark L2 is related to the landmark L1, and the landmark L3 is related to the landmark L4.

As discussed above, the recommendation data is a recommended image capturing time period, composition information, a thumbnail, or the like. In the example illustrated in FIG. 4, for example, 13 o'clock to 17 o'clock is shown as the recommended image capturing time period for the landmark L1, and 18 o'clock to 20 o'clock is shown as the recommended image capturing time period for the landmark L2.

As discussed above, the related information is the name, the explanation, or the like of each landmark. In the example illustrated in FIG. 4, for example, the name "BB temple" and the explanation of the landmark L1, and the name "AA tower" and the explanation of the landmark L2 are shown.

The server 3 transmits such data including priority to the digital camera 1. The digital camera 1 performs display control based on the received data including priority.

The basic configurations of the digital camera 1 and the server 3 included in the imaging system in accordance with the present embodiment have been described in detail above. Next, the operation process of the imaging system in accordance with the present embodiment will be specifically described.

<3. Operation Process>

Figure 5:
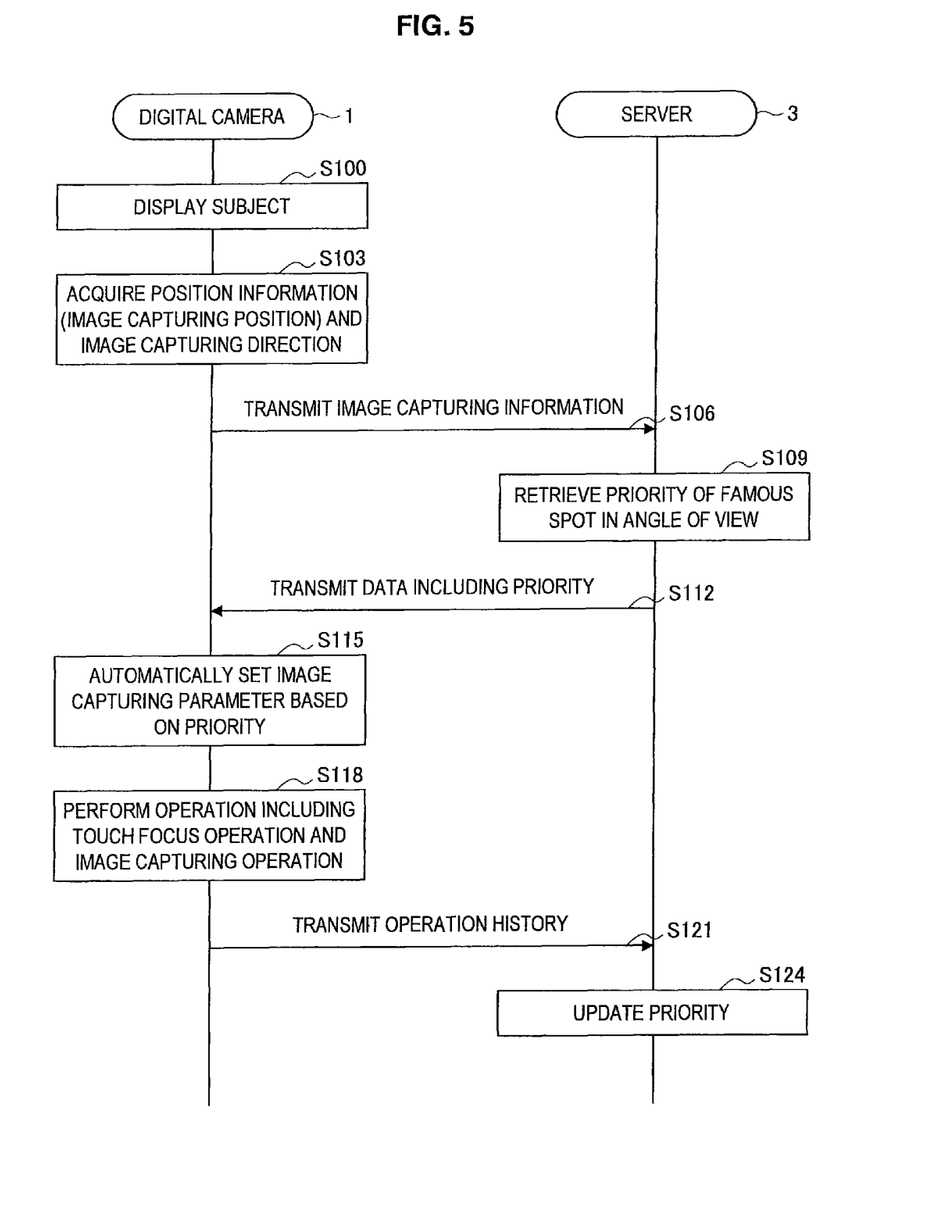
FIG. 5 is a flowchart illustrating an operation process in accordance with the present embodiment.

FIG. 5 is a flowchart illustrating an operation process in accordance with the present embodiment. As illustrated in FIG. 5, first, in step S100, the display control unit 20 of the digital camera 1 causes the display unit 21 to display, in real time, a subject image output from the camera module 15.

Next, in step S103, the CPU 10 acquires the position information of the digital camera 1 from the GPS measurement unit 14, and the image capturing direction from the direction sensor 13.

Then, in step S106, the digital camera 1 transmits, to the server 3, the image capturing information including the position information and the image capturing direction. The digital camera 1 may further transmit, as image capturing information, the angle of view (zoom proportion) calculated from an image capturing parameter output from the camera module 15.

Next, in step S109, the server 3 retrieves the priority of a famous spot (landmark) included in the angle of view with reference to the landmark DB 33 based on the image capturing information received from the digital camera 1.

Next, in step S112, the server 3 transmits the retrieved data including priority (see FIG. 4) to the digital camera 1.

Then, in step S115, the digital camera 1 performs control based on the data including priority received from the server 3 such that a landmark having high priority among recognized subjects is indicated. More specifically, for example, the digital camera 1 may automatically set an image capturing parameter such that a landmark having high priority is focused on. The digital camera 1 may automatically zoom, automatically adjust white balance or exposure, or the like as automatic setting of the image capturing parameter.

Alternatively, the digital camera 1 may perform display control on an indicator indicative of a landmark having high priority among recognized subjects.

Figure 6:
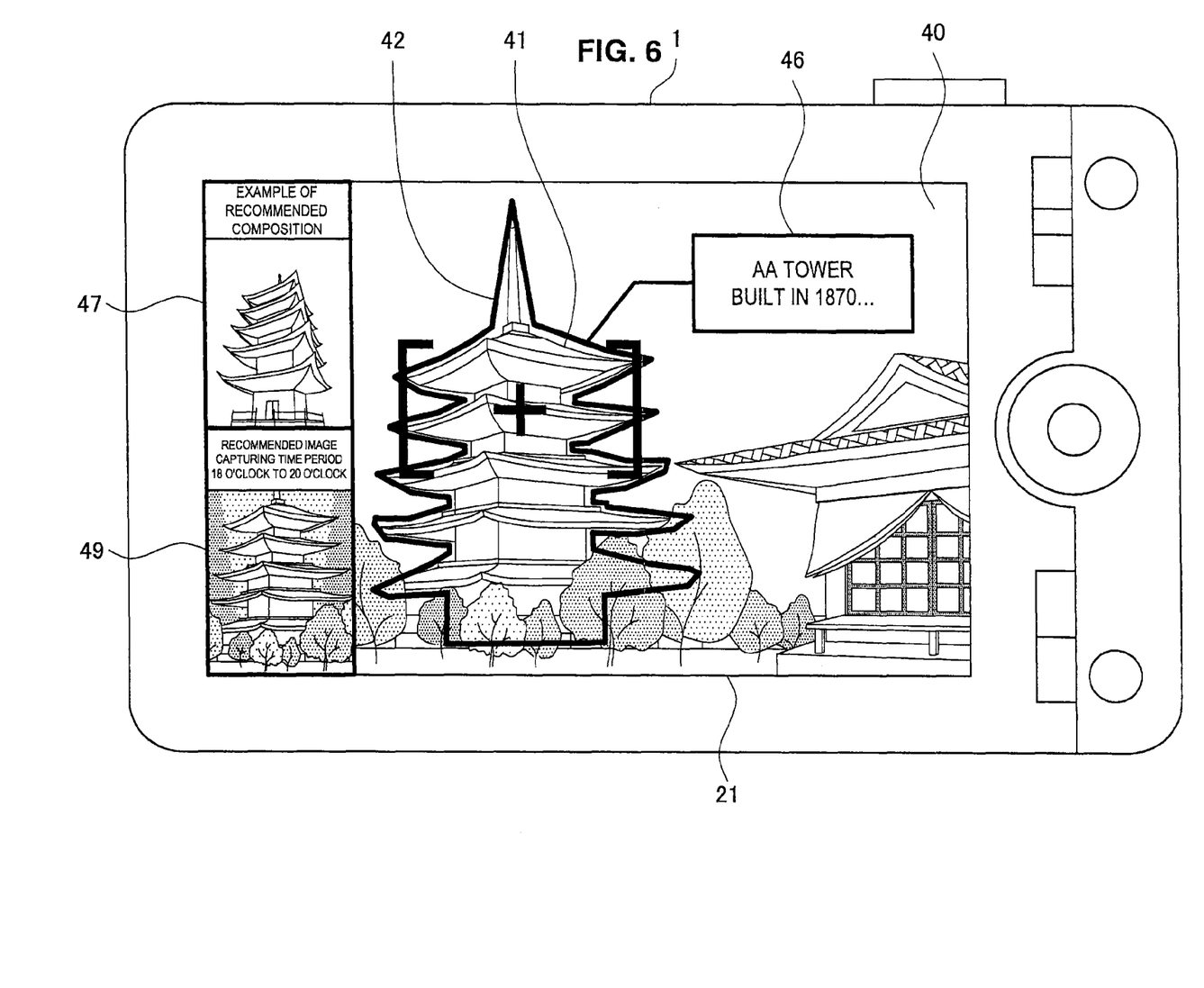
FIG. 6 is a diagram illustrating an example of a display screen that shows a landmark (famous spot) having high priority in accordance with the present embodiment.

Here, an example of a display screen showing a landmark (famous spot) having high priority will be described with reference to FIG. 6. As illustrated in FIG. 6, the digital camera 1 performs display control such that a subject 41 (landmark L1) having high priority that is a recognized subject among subjects shown in a real image 40 is surrounded with a marker 42. Further, the digital camera 1 automatically sets an image capturing parameter so as to focus on the subject 41.

As illustrated in FIG. 6, the digital camera 1 may also superimpose a display column 46 showing the name and the explanation on the real image 40 based on the related information of the subject 41 (landmark L1) that is included in the data including priority. A timing at which the display column 46 is displayed may be a timing at which a particular subject is focused on or captured, the composition is decided, or the like.

Further, the digital camera 1 may perform control based on the recommendation data that is included in the data including priority such that an example of a recommended composition or a recommended image capturing time period for the subject 41 is displayed on the display unit 21. Here, the digital camera 1 may show the example of the recommended composition or the recommended image capturing time period in the form of text data, or as illustrated in FIG. 6, in the form of a thumbnail 47 of an image captured in the recommended composition or a thumbnail 49 of an image captured in the recommended image capturing time period.

The digital camera 1 may also perform display control such that based on the rule of thirds, for example, two horizontal lines and two vertical lines are superimposed at equal intervals on the real image 40 and the display screen of the display unit 21 is divided into nine equal parts, which may be used as an example of a recommended composition.

Therefore, a user can intuitively understand which is a famous spot among the subjects shown in the real image 40, and capture a famous subject (famous spot) that is captured by a lot of people.

The name and the explanation of the famous spot are also displayed so that the utility of the digital camera 1 is improved.

Since examples of a recommended composition and a time period are displayed as recommendation data for capturing a famous spot, a user can take a better picture by referring thereto.

Next, returning to FIG. 5, the operation process in accordance with the present embodiment is described again. In next steps S118 to S124, the priority in the landmark DB 33 of the server 3 is updated based on a history of an operation actually performed by a user.

Specifically, in step S118, the operation input unit 16 of the digital camera 1 detects an operation including touch focus and an image capturing operation performed by a user.

Then, in step S121, the digital camera 1 transmits, to the server 3, the operation detected by the operation input unit 16 as an operation history. At that time, the digital camera 1 may also transmit, to the server 3: a captured image; the position information (image capturing position), the image capturing direction, and the image capturing date and time information associated with the captured image; and the position information of a target subject to be captured (to be focused on, or the like). The digital camera 1 may also transmit, to the server 3, an image capturing parameter at the time of image-capturing.

Figure 7:
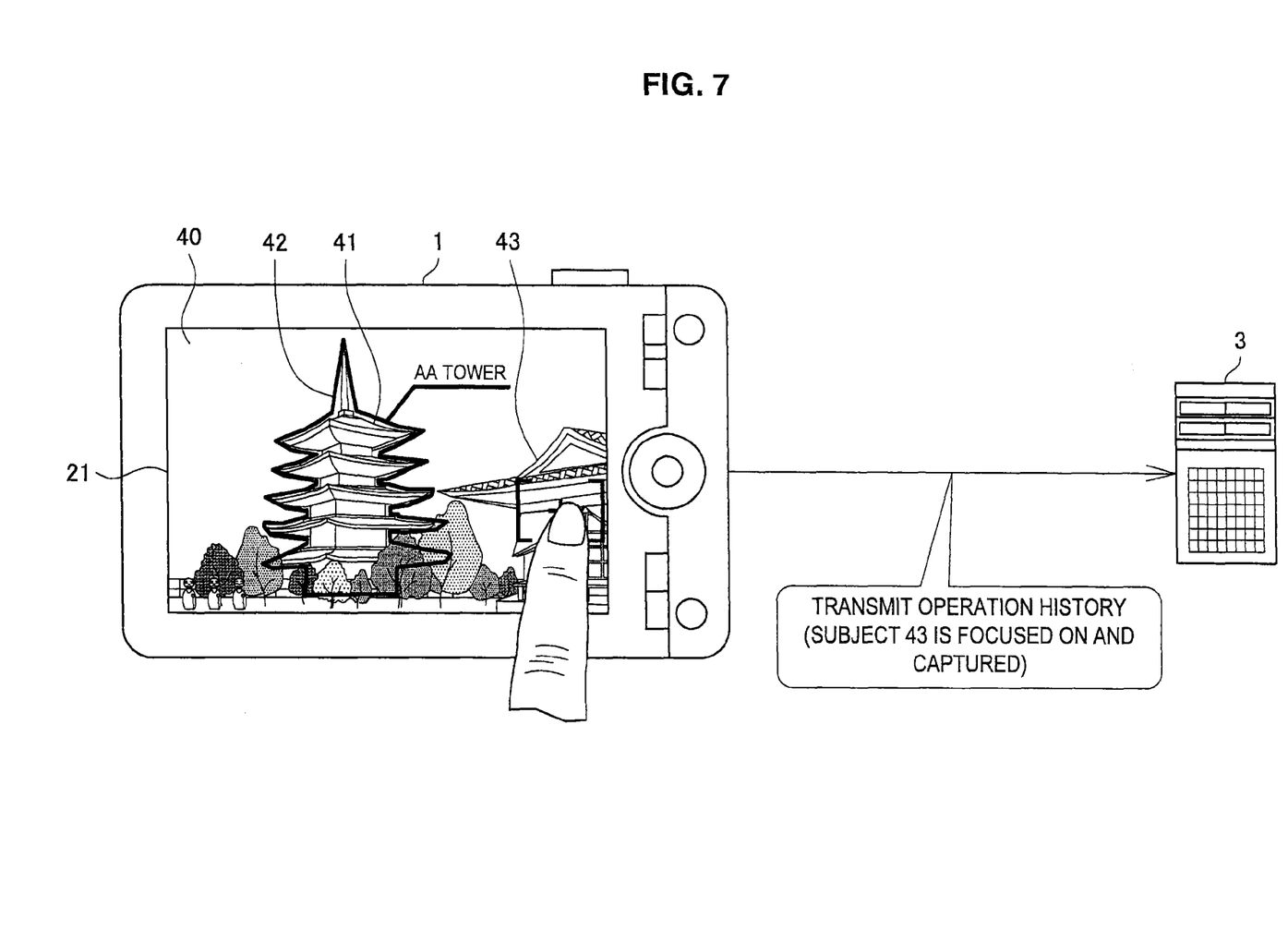
FIG. 7 is a diagram for describing transmission of an operation history in accordance with the present embodiment.

Here, it is possible that a user pays attention to and captures a subject other than a particular subject that has high priority and is indicated by the digital camera 1 based on data including priority. For example, as illustrated in FIG. 7, even if a subject 41 having high priority is surrounded with a marker 42, and explicitly designated as a famous spot, a user sometimes desires to capture another subject 43 shown in a real image 40. In such a case, the user performs a touch focus operation on the subject 43 shown in the real image 40, focuses on the subject 43, and performs an image capturing operation. Then, the digital camera 1 transmits such an operation history (the digital camera 1 focuses on the subject 43 in accordance with the user operation and performs image-capturing) to the server 3.

Next, in step S124, the server 3 updates the priority in the landmark DB 33 based on the operation history received from the digital camera 1. More specifically, for example, information regarding which subject (spot) a user pays attention to (for example, focuses on) based on the operation history is used as statistical data of priority and is updated. The server 3 also stores, in the landmark DB 33, other information received from the digital camera 1 that includes, for example, the captured image, the position information, the image capturing direction, or the image capturing date and time in association with a landmark corresponding to the subject to which attention is paid. When no landmark corresponding to the subject which attention is paid to (captured) is registered in the landmark DB 33, the server 3 may register a subject to which attention is paid as a new landmark.

The server 3 may also receive a plurality of operation histories, captured images, and the like from the digital camera 1, grasp a subject (spot) captured by a user in the same period, and update a relationship of each spot with another spot.

In this way, the server 3 can update the priority or the like of a famous spot stored in the landmark DB 33 based on the operation history of each user.

The operation process of the imaging system in accordance with the present embodiment has been described in detail above. In automatically setting the image capturing parameter based on the priority in step S115, the digital camera 1 may sequentially display particular landmarks in response to a user operation. The description thereof will be specifically made with reference to FIG. 8 below.

Figure 8:
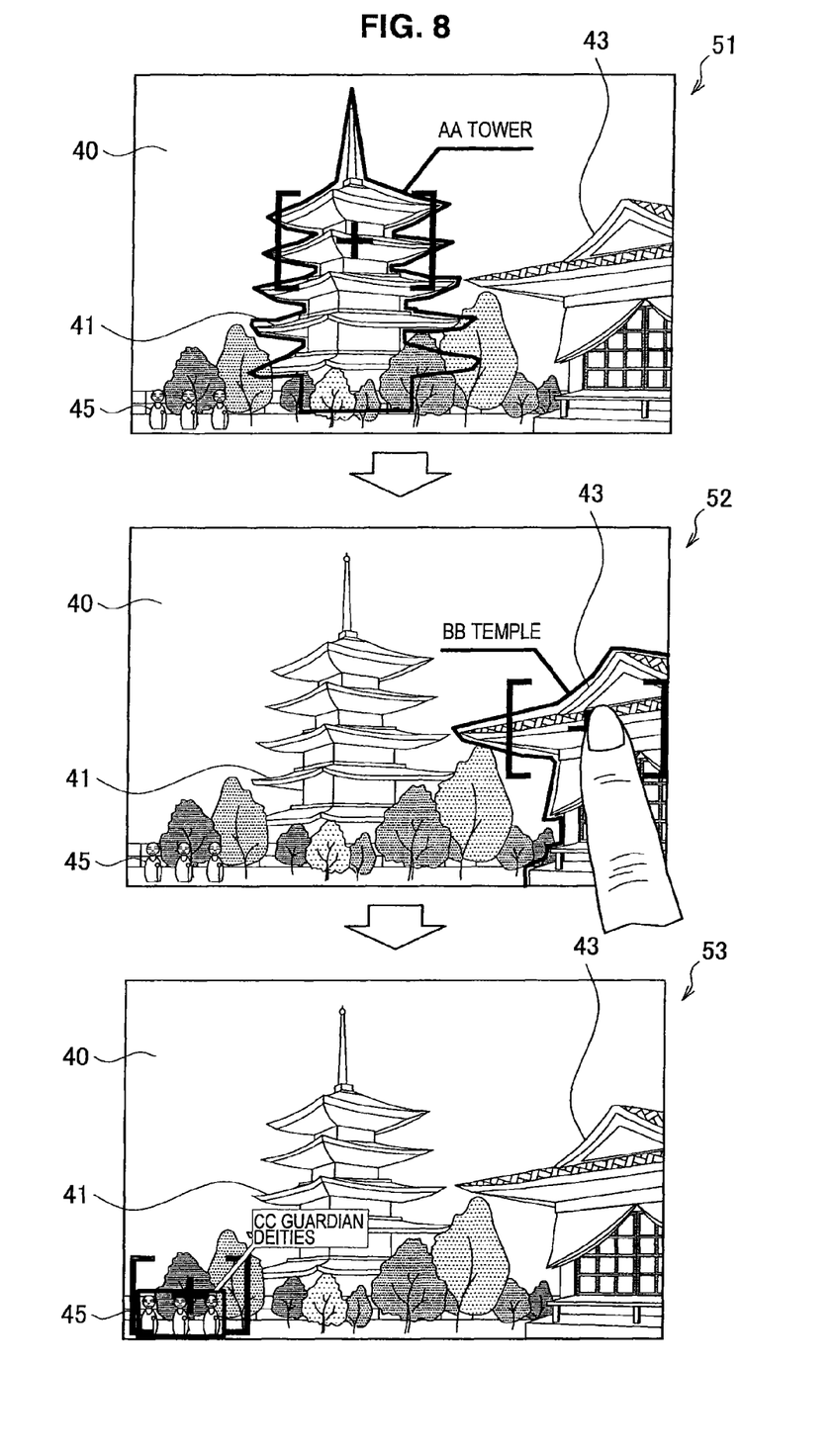
FIG. 8 is a diagram for describing an example in which famous spots are sequentially shown in accordance with the present embodiment.

FIG. 8 is a diagram for describing an example in which famous spots (landmarks) are sequentially showed in accordance with the present embodiment. As illustrated in FIG. 8, a real image 40 includes subjects 41, 43, and 45.

Here, as displayed by a display screen 51 of FIG. 8, the digital camera 1 focuses on the subject 41, which has the highest priority out of the subjects 41, 43, and 45, based on the data including priority received from the server 3. In this case, when a user performs the touch focus operation on the subject 43, as illustrated in a display screen 52, the digital camera 1 surrounds the recognized subject 43 with a marker 44, and performs control to focus on the subject 43. Further, the digital camera 1 may display the name "BB temple," or the like of the subject 43 based on the data including priority.

After the user focuses on and captures the subject 43, as illustrated in a display screen 53 of FIG. 8, the digital camera 1 recognizes and focuses on the next subject 45 based on the data including priority. Here, the next subject 45 that is recognized by the digital camera 1 is another landmark related to the subject 43, which a user just previously paid attention to and captured. As discussed above, the data including priority includes information indicative of another landmark that is related to the landmark. Since it is possible that the user successively captures the other related landmark, the digital camera 1 automatically sets an image capturing parameter so as to focus on the other related landmark.

In this way, the digital camera 1 in accordance with the present embodiment is capable of sequentially displaying particular subjects in a real image in response to the data including priority and a user operation.

<4. Conclusion>

As discussed above, the imaging system in accordance with the present embodiment performs control based on the priority of each famous spot (landmark) such that a subject having high priority among respective subjects in the angle of view is indicated. Accordingly, since a user can be informed of a famous spot having high priority in the present embodiment, the user can intuitively recognize which of subjects in the angle of view is a famous spot.

It should be understood by those skilled in the art that various modifications, combinations, sub-combinations and alterations may occur depending on design requirements and other factors insofar as they are within the scope of the appended claims or the equivalents thereof.

For example, in the embodiment described above, the server has the landmark DB 33, and extracts the data including priority of each landmark in the angle of view. However, the embodiment of the present disclosure is not limited thereto. For example, in the embodiment of the present disclosure, a client terminal may have the landmark DB 33, and may extract the data including priority of each landmark (subject) in the angle of view.

In the embodiment described above, an example of displaying recommended composition information in the form of text data and a thumbnail has been described. However, the display of the recommended composition in accordance with the present embodiment is not limited thereto. For example, when the digital camera 1 is located on an auxiliary device (tripod, desktop, or the like) capable of automatically adjusting the angle, the image capturing direction, the zoom, or the like, the digital camera 1 may output the recommended composition information (including the angle, the direction, and the zoom) to the auxiliary device. The digital camera 1 may be moved by the auxiliary device, and the direction and the angle may be adjusted, so that a real image in the recommended composition may be displayed on the display unit 21.

In the embodiment described above, as illustrated in FIG. 1, the subject 41 having high priority among the recognized subjects in the real image is surrounded with the marker 42, but a way of indicating a particular subject (landmark) in accordance with the present embodiment is not limited thereto. For example, when a subject having high priority is small on the screen, an arrow may be used that indicates the subject.

Additionally, the present technology may also be configured as below.

(1) A server including:

a database configured to store position information and priority of a landmark;

a reception unit configured to receive, from a client terminal, position information of the client terminal; and a transmission unit configured to transmit, to the client terminal, the position information of the landmark corresponding to the position information received by the reception unit, and the priority of the landmark, wherein the reception unit receives position information of a subject captured by the client terminal, and wherein, based on the position information of the subject received by the reception unit, the server further includes a control unit configured to perform control in a manner that the priority of the landmark stored in the database is updated.

(2) The server according to (1),
wherein the reception unit receives an operation history of the client terminal in which an image capturing parameter has been automatically set based on the position information and the priority of the landmark, and
wherein the control unit updates the priority stored in the database based on the operation history received by the reception unit.
(3) The server according to (1) or (2), wherein the server collects statistical data of the operation history stored in the database, and further comprises a determination unit configured to determine priority of a landmark included in an angle of view of the client terminal.
(4) The server according to any one of (1) to (3), wherein the subject captured by the client terminal is a subject for which the priority of the landmark has been set.
(5) The server according to (2), wherein the image capturing parameter is a parameter for adjusting a degree of focus, white balance, or exposure.
(6) The server according to any one of (1) to (5), wherein the database further stores a recommended image capturing time period of the landmark.
(7) The server according to any one of (1) to (6), wherein the database further stores a recommended image capturing condition of the landmark.
(8) A client terminal including:
a transmission unit configured to transmit, to a server, position information of the client terminal;
a reception unit configured to receive, from the server, position information and priority of a landmark positioned near a position of the client terminal indicated in the position information; and
a control unit configured to perform display control on an indicator indicative of a particular subject in an angle of view based on the position information and the priority of the landmark that are received from the server.
(9) The client terminal according to (8), wherein the transmission unit transmits, to the server, an operation history of a user after the control unit performs the display control on the indicator indicative of the particular subject in the angle of view based on the position information and the priority.
(10) The client terminal according to (8) or (9), wherein the transmission unit transmits, to the server, position information of a subject captured by an imaging unit.
(11) The client terminal according to (8) or (9), wherein, when a subject is captured, on which a focus adjustment, a white balance adjustment, or an exposure adjustment is performed based on the position information and the priority received from the server, the transmission unit transmits, to the server, position information of the subject.
(12) The client terminal according to any one of (8) to (11), wherein the control unit performs control based on the position information and the priority received from the server in a manner that an image capturing parameter of an imaging unit is automatically set.
(13) A system including:
a database configured to store position information and priority of a landmark; and
a control unit configured to perform display control on an indicator indicative of a particular subject in an angle of view based on the position information of the landmark corresponding to position information of a client terminal, and the priority of the landmark,
wherein the control unit performs control based on position information of a subject captured by the client terminal in a manner that the priority of the landmark stored in the database is updated.
(14) A storage medium having a program stored therein, the program causing a computer to execute:
receiving, from a client terminal, position information of the client terminal;
transmitting, to the client terminal, position information of a landmark corresponding to the position information received in the receiving step, and priority of the landmark;
receiving position information of a subject captured by the client terminal; and
performing control based on the position information of the subject in a manner that the priority of the landmark stored in a database is updated.
(15) A storage medium having a program stored therein, the program causing a computer to execute:
transmitting, to a server, position information of a client terminal;
receiving, from the server, position information and priority of a landmark positioned near a position of the client terminal that is indicated in the position information; and
performing display control on an indicator indicative of a particular subject in an angle of view based on the position information and the priority of the landmark received from the server.

The present disclosure contains subject matter related to that disclosed in Japanese Priority Patent Application JP 2012-071338 filed in the Japan Patent Office on Mar. 27, 2012, the entire content of which is hereby incorporated by reference.

What is claimed is:

1. A server comprising:
a database configured to store position information and priority of a plurality of landmarks;
a reception unit configured to receive, from a client terminal, position information of the client terminal, wherein the reception unit receives an operation history of the client terminal in which an image capturing parameter has been automatically set based on the position information and the priority of the plurality of landmarks;
a transmission unit configured to transmit, to the client terminal, the position information and the priority of the plurality of landmarks corresponding to the position information received by the reception unit,
wherein the priority of the plurality of landmarks is based on a current time, and
wherein the reception unit receives position information of a subject captured by the client terminal; and
a control unit configured to perform control in a manner that the priority of the plurality of landmarks stored in the database is updated based on the position information of the subject received by the reception unit, and wherein the control unit updates the priority of the plurality of landmarks stored in the database based on the operation history received by the reception unit.

2. The server according to claim 1, wherein the server collects statistical data of an operation history of the client terminal stored in the database, and further comprises a determination unit configured to determine priority of a landmark included in an angle of view of the client terminal.

3. The server according to claim 1, wherein the subject captured by the client terminal is a landmark of the plurality of landmarks for which the priority has been set.

4. The server according to claim 1, wherein the image capturing parameter is a parameter for adjusting a degree of focus, white balance, or exposure.

5. The server according to claim 1, wherein the database is configured to store a recommended image capturing time period of each of the plurality of landmarks.

6. The server according to claim 1, wherein the database is configured to store a recommended image capturing condition of each of the plurality of landmarks.

7. The server according to claim 1, wherein the priority of the plurality of landmarks is set by a service provider.

8. The server according to claim 1, further comprises a determination unit configured to determine the priority of each of the plurality of landmarks based on operation history of the client terminal.

9. The server according to claim 8, wherein the determination unit is configured to determine the priority of each of the plurality of landmarks by assigning a weight to the operation history.

10. The server according to claim 1, wherein the priority of each of the plurality of landmarks is based on the position information of the client terminal.

11. A client terminal comprising:
a transmission unit configured to transmit, to a server, position information of the client terminal, position information of a subject captured by the client terminal, and operation history of the client terminal in which an image capturing parameter has been automatically set based on position information and priority of a plurality of landmarks;
a reception unit configured to receive from the server, based on the position information of the client terminal, position information and priority of the plurality of landmarks
wherein the priority of the plurality of landmarks is based on a current time, and is updated at the server based on the operation history of the client terminal; and
a control unit configured to perform display control on an indicator indicative of the subject in an angle of view of the client terminal based on the position information and the priority of the plurality of landmarks received from the server.

12. The client terminal according to claim 11, wherein the transmission unit transmits, to the server, an operation history of a user of the client terminal after the control unit performs the display control on the indicator indicative of the subject in the angle of view based on the position information and the priority of the plurality of landmarks.

13. The client terminal according to claim 11, wherein the transmission unit transmits, to the server, position information of a subject captured by an imaging unit.

14. The client terminal according to claim 11, wherein, when a subject is captured, on which a focus adjustment, a white balance adjustment, or an exposure adjustment is performed based on the position information and the priority of the plurality of landmarks received from the server, the transmission unit transmits, to the server, position information of the subject.

15. The client terminal according to claim 11, wherein the control unit performs control based on the position information and the priority of the plurality of landmarks received from the server in a manner that an image capturing parameter of an imaging unit is automatically set.

16. The client terminal according to claim 11, further comprising an image recognition unit configured to recognize the subject based on recognition information stored in the client terminal, wherein the image recognition unit switches the recognition information based on a recognition switching parameter received from the server.

17. A system comprising:
a database configured to store position information and priority of a plurality of landmarks; and
a control unit configured to perform display control on an indicator indicative of a subject in an angle of view of a client terminal, based on the position information and the priority of landmarks corresponding to position information of the client terminal,
wherein the priority of the plurality of landmarks is based on a current time, and wherein the control unit performs control based on position information of the subject captured by the client terminal in a manner that the priority of the plurality of landmarks stored in the database is updated, and wherein the control unit updates the priority of the plurality of landmarks stored in the database based on operation history of the client terminal in which an image capturing parameter has been automatically set based on the position information and the priority of the plurality of landmarks.

18. A non-transitory computer-readable storage medium having a program stored therein, the program causing a computer to execute:
receiving, from a client terminal, position information of the client terminal and operation history of the client terminal in which an image capturing parameter has been automatically set based on the position information and priority of a plurality of landmarks;
transmitting, to the client terminal, position information and priority of the plurality of landmarks corresponding to the position information of the client terminal, received in the receiving step, and priority of the landmark;
wherein the priority of the plurality of landmarks is based on a current time;
receiving position information of a subject captured by the client terminal; and
performing control based on the position information of the subject in a manner that the priority of the plurality of landmarks stored in a database is updated, and wherein the control updates the priority of the plurality of landmarks stored in the database based on the operation history.

19. A non-transitory computer-readable storage medium having a program stored therein, the program causing a computer to execute:
transmitting, to a server, position information of a client terminal, position information of a subject captured by the client terminal, and operation history of the client terminal in which an image capturing parameter has been automatically set based on position information and priority of a plurality of landmarks;
receiving, from the server, based on the position information of the client terminal, position information and priority of the plurality of landmarks
wherein the priority of the plurality of landmarks is based on a current time, and is updated at the server based on the operation history of the client terminal; and
performing display control on an indicator indicative of the subject in an angle of view of the client terminal based on the position information and the priority of the plurality of landmarks received from the server.

* * * * *